(12) United States Patent
Jess

(10) Patent No.: US 8,341,349 B2
(45) Date of Patent: Dec. 25, 2012

(54) SYSTEM AND METHOD FOR LOOSE COUPLING BETWEEN RAID VOLUMES AND DRIVE GROUPS

(75) Inventor: Martin Jess, Erie, CO (US)

(73) Assignee: LSI Corporation, Milpitas, CA (US)

( * ) Notice: Subject to any disclaimer, the term of this patent is extended or adjusted under 35 U.S.C. 154(b) by 574 days.

(21) Appl. No.: 12/290,590

(22) Filed: Oct. 31, 2008

(65) Prior Publication Data

US 2010/0115198 A1   May 6, 2010

(51) Int. Cl.
G06F 13/00 (2006.01)
G06F 13/28 (2006.01)

(52) U.S. Cl. ........ 711/114; 711/154; 711/161; 711/162; 711/E12.103

(58) Field of Classification Search .......................... None
See application file for complete search history.

(56) References Cited

U.S. PATENT DOCUMENTS

| | | | |
|---|---|---|---|
| 5,518,844 A * | 5/1996 | Matsumoto et al. | 430/30 |
| 6,311,251 B1 * | 10/2001 | Merritt et al. | 711/114 |
| 2005/0182898 A1 | 8/2005 | Davis et al. | |
| 2005/0279837 A1 | 12/2005 | Hajji | |
| 2006/0271734 A1 | 11/2006 | Strange et al. | |
| 2007/0143541 A1 | 6/2007 | Nichols | |

* cited by examiner

Primary Examiner — Kevin Verbrugge
Assistant Examiner — Eric S Cardwell
(74) Attorney, Agent, or Firm — Suiter Swantz pc llo

(57) ABSTRACT

The present disclosure describes a system and method for allocating volume pieces across a redundant array of inexpensive discs (RAID).

A method for allocating volume pieces across a redundant array of inexpensive discs (RAID) may comprise: (a) associating one or more volume pieces of a first logical volume with a first set of drives in a drive group; and (b) associating one or more volume pieces of a second logical volume with a second set of drives in the drive group, wherein the first set of drives in the drive group includes at least one drive which is not a member of the second set of drives in the drive group.

A system for allocating volume pieces across a redundant array of inexpensive discs (RAID) may comprise: (a) means for associating one or more volume pieces of a first logical volume with a first set of drives in a drive group; and (b) means for associating one or more volume pieces of a second logical volume with a second set of drives in the drive group, wherein the first set of drives in the drive group includes at least one drive which is not a member of the second set of drives in the drive group.

10 Claims, 15 Drawing Sheets

RAID 303

| Drive 0 | Drive 1 | Drive 2 | Drive 3 | Drive 4 | Drive 5 |
|---|---|---|---|---|---|
| Volume Piece A-0 | Volume Piece A-1 | Volume Piece A-2 | Volume Piece B-0 | Volume Piece B-1 | Volume Piece C-0 |
| Volume Piece C-1 | | Volume Piece B-2 | Volume Piece C-2 | | |

RAID 303

| Drive 0 | Drive 1 | Drive 2 | Drive 3 | Drive 4 | Drive 5 |
|---|---|---|---|---|---|
| Volume Piece A-0 | Volume Piece A-1 | Volume Piece A-2 | Volume Piece B-0 | Volume Piece B-1 | Volume Piece C-0 |
| Volume Piece C-1 | | Volume Piece B-2 | Volume Piece C-2 | | |
| | | | | | |

FIG. 4

SYSTEM AND METHOD FOR LOOSE COUPLING BETWEEN RAID VOLUMES AND DRIVE GROUPS

BACKGROUND

A drive group may be a collection of associated drives used to store volume data. A drive group may be assigned a RAID level, which defines the data organization and redundancy model. A RAID volume may be the host accessible logical unit targeted for data I/O. A drive group may contain multiple volumes. All volumes within the drive group use the same set of physical drives and function at the same RAID level.

Drives of a drive group may include different capacities. The usable capacity of the volume group may be the RAID factor capacity based on the smallest drive in the group, excluding the region reserved for storage array configuration data. The free capacity of a drive group may be the usable capacity minus the capacity of any defined volumes. Free drive group capacity may be used to create additional volumes or expand the capacity of the existing volumes.

A RAID volume may occupy a region on each drive in the drive group. The regions for a RAID volume may all have the same offset in logical block addresses (LBAs) from the beginning of the drive and the same length in LBAs. Each such region that may be part of a given volume may be referred to as a piece. The collection of pieces for a volume may be referred to as a volume extent. A drive group may also have one or several free extents, each consisting of regions of unused capacity on the drive with the same offset and length.

The number of physical drives in a drive group may be referred to as the drive group width. The width affects both performance and accessibility for the RAID volumes in the drive group. The wider the drive group, the more physical spindles may be deployed in parallel and this increases performance for certain host I/O profiles. However, the wider the drive group, the higher the risk may be that one of its physical drives may fail.

The segment size may be an amount of data a controller writes to a single drive before writing data to the next drive of the drive group. A stripe may be a collection of segments, one on each drive of the drive group, all with same offset from the beginning of their drives. Consequently, a volume may also be viewed as a collection of stripes.

FIGS. 1 and 2 illustrate a drive group consisting of n+1 drives. Volume B may consist of n+1 pieces, B-0, B-1 . . . B-n. Each piece contains a number of segments. For example, piece B-0 may contains $Seg-B0_0$, $Seg-BO_1$. . . $Seg-BO_k$. A stripe goes across the drives, for example, segments $Seg-B0_2$, $Seg-B1_2$. . . $Seg-Bn_2$ form a stripe $B_2$. Volume B may consist of k+1 stripes.

Such a RAID layout may be algorithmic in the sense that it may be a simple calculation to determine which physical drive LBA on which drive in the drive group corresponds to a specific RAID volume virtual LBA. The RAID volumes may be also said to be tightly coupled with the drive group as the width of the drive group defines the width of the RAID volumes.

A physical drive in a drive group may fail completely so the data on it may be no longer accessible. If the drive group may include a RAID level with redundancy, (i.e., a non-RAID 0 drive group), there may be still enough data left on the remaining drives that the host may still access the data. However, except for RAID 6 and some specific RAID 1/10 cases, the drive group may no longer include redundancy until the failed drive is replaced and the data is reconstructed.

For RAID 1/10, this reconstruction may consist of copying all the data from the mirror drive to the replacement drive. For RAID 5 this reconstruction may consist of reading each stripe from the surviving drives in the drive group, (i.e., drive group width—1 segments) calculating the missing segment using parity and writing the recovered segment to the replacement drive.

The same approach may be followed for a single drive failure in a RAID 6 P+Q drive group except that the missing segment may be calculated from drive group width—2 segments due to the dual redundancy information.

Until the failed drive is replaced and the reconstruction is complete, a second drive failure will result in complete loss of data in the drive group unless the drive group is configured to tolerate multiple drive failures (e.g. RAID 6).

A storage array may dedicate a pool of unused physical drives in the storage array as hot spares. When a physical drive fails in a drive group with a redundant RAID level (i.e., non-RAID 0) the storage array may automatically allocate a replacement drive from the pool of hot spare drives and perform a reconstruction of the lost data on the hot spare drive.

Once the failed drive is replaced, the contents of the hot spare drive may be simply copied to the replacement drive, a process called copy-back. When a copy-back completes, the hot spare may be returned to the hot spare pool.

All the writes directed to a drive undergoing the reconstruction create a performance bottleneck for the process. Consequently, there may be a noticeable performance degradation during a drive reconstruction for any RAID volume in the affected drive group.

In addition, as physical drive sizes keep increasing, the reconstruction time for a single drive increases dramatically. A SATA drive may currently have capacity in excess of 1 TB and all of that data will have to be reconstructed and written to a single hot spare/replacement drive. This prolongs the performance degradation that hosts will experience for RAID volumes in the affected drive group and it also prolongs the time where a drive group may be without redundancy (e.g., for a RAID 5 drive group).

SUMMARY

The present disclosure describes a system and method for allocating volume pieces across a redundant array of inexpensive discs (RAID).

A method for allocating volume pieces across a redundant array of inexpensive discs (RAID) may comprise: (a) associating one or more volume pieces of a first logical volume with a first set of drives in a drive group; and (b) associating one or more volume pieces of a second logical volume with a second set of drives in the drive group, wherein the first set of drives in the drive group includes at least one drive which is not a member of the second set of drives in the drive group.

A system for allocating volume pieces across a redundant array of inexpensive discs (RAID) may comprise: (a) means for associating one or more volume pieces of a first logical volume with a first set of drives in a drive group; and (b) means for associating one or more volume pieces of a second logical volume with a second set of drives in the drive group, wherein the first set of drives in the drive group includes at least one drive which is not a member of the second set of drives in the drive group.

It may be to be understood that both the foregoing general description and the following detailed description may be exemplary and explanatory only and may be not necessarily restrictive of the claims. The accompanying drawings, which may be incorporated in and constitute a part of the specification, illustrate examples and together with the general description, serve to explain the principles of the disclosure.

BRIEF DESCRIPTION OF THE DRAWINGS

The numerous advantages of the disclosure may be better understood by those skilled in the art by reference to the accompanying figures in which:

FIG. 4 shows a high-level system diagram for a RAID.

DETAILED DESCRIPTION

Figure 1:
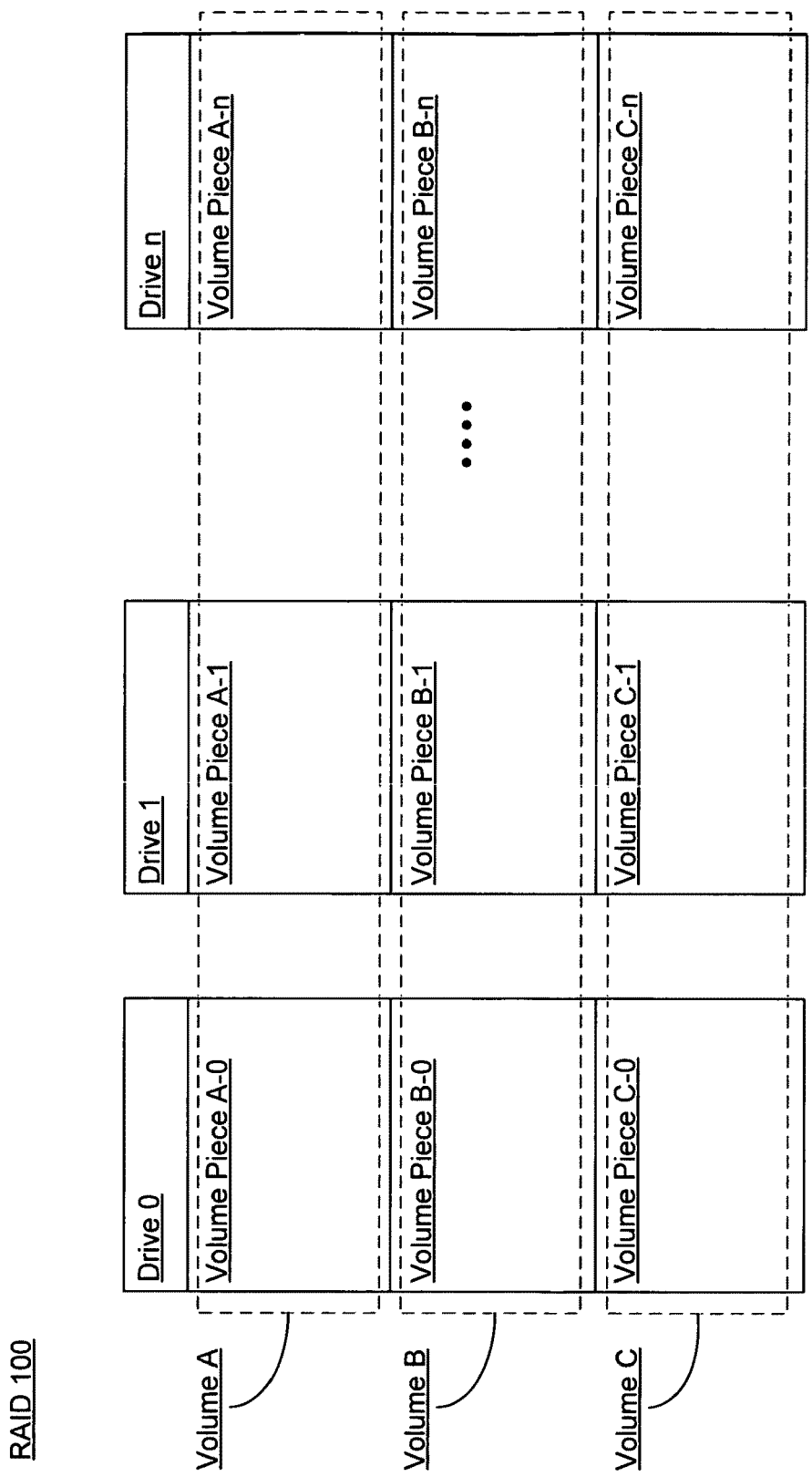
FIG. 1 shows a high-level system diagram for a RAID.
Figure 2:
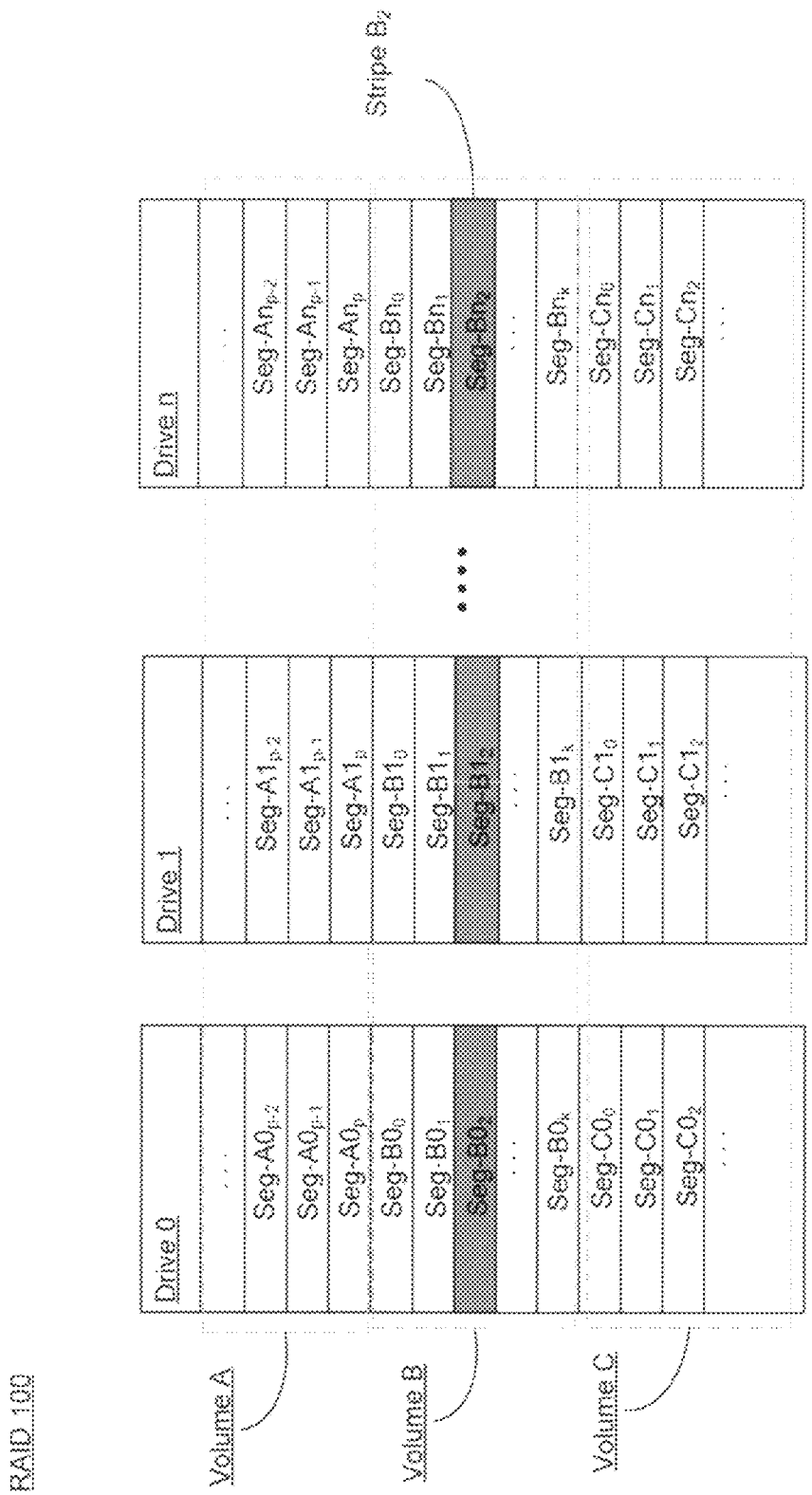
FIG. 2 shows a high-level system diagram for a RAID.

In the following detailed description, reference may be made to the accompanying drawings, which form a part hereof. In the drawings, similar symbols typically identify similar components, unless context dictates otherwise. The illustrative embodiments described in the detailed description, drawings, and claims may be not meant to be limiting. Other embodiments may be utilized, and other changes may be made, without departing from the spirit or scope of the subject matter presented here.

Figure 3:
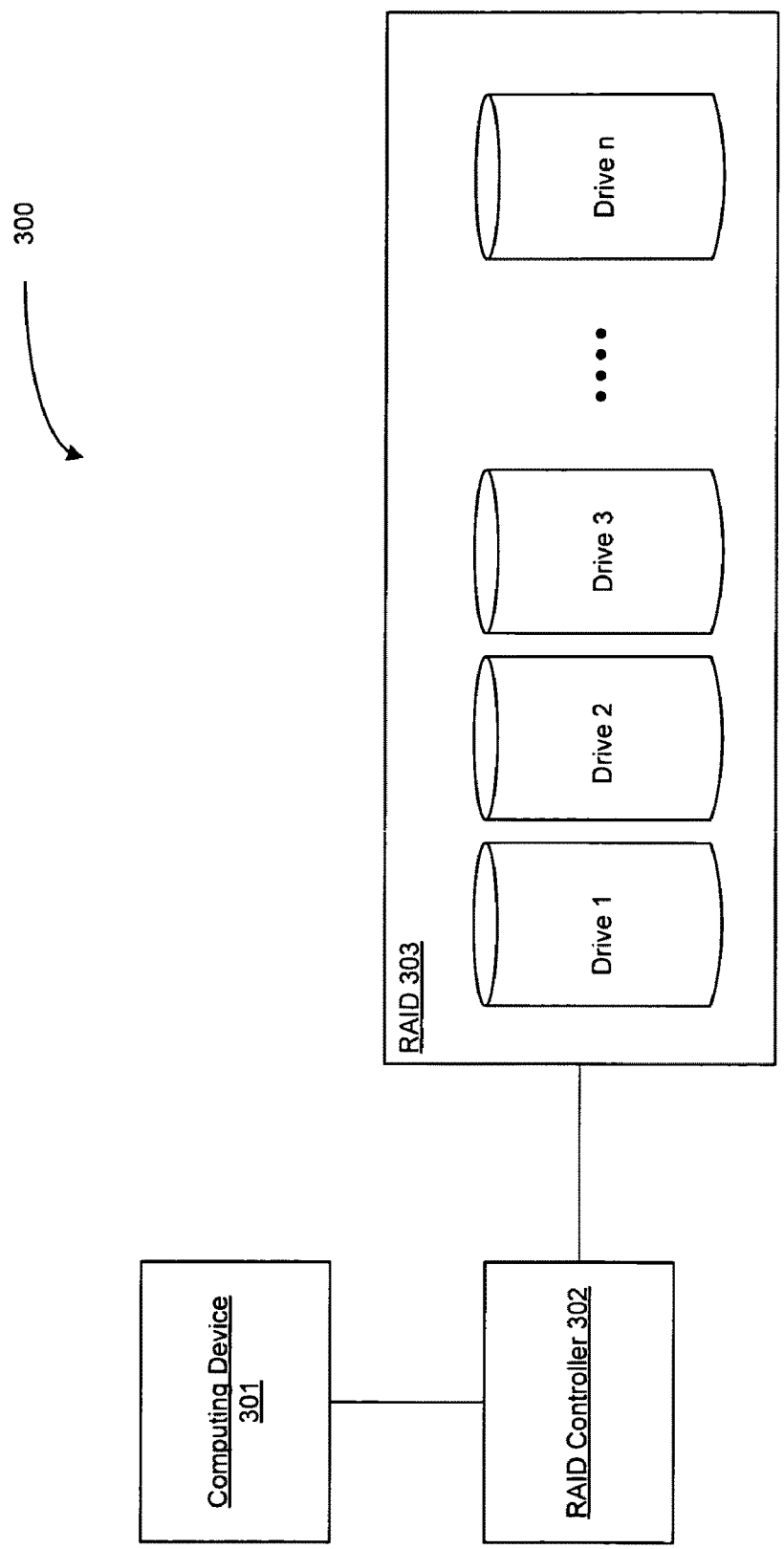
FIG. 3 shows a high-level system diagram for allocating volumes pieces to a RAID.

Referring to FIG. 3, an illustrative representation of a mass storage system 300 comprising a computing device 301, a RAID controller 302, and RAID 303 is shown. The RAID controller 302 may include volume management circuitry/software whereby the RAID controller 302 can process read/write requests of the computing device 301 accessing various logical volumes configured on the RAID 303. The RAID 303 may include a drive group having n drives.

The RAID volumes pieces of the RAID 303 may be loosely coupled with the drive group as opposed to the 1:1 coupling previously described. This may be illustrated in the examples below:

Referring to FIG. 4, three RAID volumes (e.g. Volumes A, B and C) may be placed on a drive group of six drives. Each RAID volume may include three volume pieces (e.g. Volume Pieces A-0, A-1 and A-2, Volume Pieces B-0, B-1 and B-2 and Volume Pieces C-0, C-1 and C-2, respectively).

Each RAID volume may have an associated RAID volume width. A RAID volume width may be defined as the number of pieces in a RAID volume regardless of the number of drives in the drive group. It may be the case that:

Width(RAID volume)≦Width(Drive Group)

For example, as shown in FIG. 3, the RAID 303 may have a drive group width of 6 (e.g. Drives 0 to 6) and a volume width of 3.

The RAID 303 may be an algorithmic layout. Besides the traditional drive group association, a RAID volume may be associated with each physical drive on which it may include a piece. For example, as shown in FIG. 3, RAID Volume A may be associated with Drive 0, Drive 1 and Drive 2 while Volume B may be associated with Drive 2, Drive 3 and Drive 4.

Each piece may also be associated with its own offset from the beginning of its respective physical drive. The various different pieces in a RAID volume may have differing offsets from the beginning of their associated physical drive in increments of the RAID volume size. For example, as shown in FIG. 3, Volume Piece B-0, Volume Piece B-1 and Volume Piece B-2 having a given volume piece size, such as 1 Mb, may have offsets of 0, 0 and 1 Mb, in Drives 3, 4 and 2, respectively.

Further, various volumes within the same drive group may have differing pieces sizes. For example, Volume A may comprise volume pieces which are 1 Mb in size while Volume B may comprise volume pieces which are 2 Mb in size. As such, Volume Piece C-1 may have a 1 Mb offset while Volume Piece C-2 may have a 2 Mb offset.

From this offset information, the physical LBA on a specific physical drive that corresponds to a specific RAID volume virtual LBA may be calculated.

Such a piece distribution may allow a user define wider drive groups with a given RAID level that may support RAID volumes of varying widths lesser than or equal to the drive group width. The greater the difference between RAID volume width and drive group width, the better the distribution of RAID volume pieces over the drive group may be.

When a RAID volume is created, the pieces may be distributed such that each physical drive may include a different combination of pieces than any other drive in the drive group. More formally, each piece on a drive may be associated with its reconstruction set (RS) which may be the set of drives that contain the remaining pieces in that RAID volume. If all the reconstruction sets for the pieces in a drive are disjoint, each piece in the subject drive may be reconstructed independently of the other pieces on the drive, (i.e. drive reconstruction may be conducted in parallel).

If all the pieces on each drive in a drive group have disjoint reconstruction sets, the drive group may be said to be fully disjoint with respect to reconstruction. This means that regardless of which drive fails, all its pieces may be reconstructed from disjoint sets of drives.

Referring again to FIG. 4, an ideal distribution of pieces is presented. In such a distribution, no physical drive may include the same combination of pieces as any other drive in the drive group. Should a drive fail in such a configuration, the number of drives that will be read from in order to reconstruct the pieces will be much larger than the RAID volume widths. For example, if Drive 2 fails, Drive 0 and Drive 1 may include the pieces for reconstructing piece A-2 (i.e. pieces A-0 and A-1) and Drive 3 and Drive 4 may include the pieces for reconstructing piece B-2 (i.e. pieces B-0 and B-1). As such, the storage array may read from 4 drives instead of 2 while performing the reconstruction.

Such a configuration may be defined by the respective the reconstruction sets (RS) for pieces A-2 and B-2 maintained on Drive 2:

RS(A-2)={Drive 0, Drive 1}
RS(B-2)={Drive 3, Drive 4}

In a further embodiment, use of dedicated hot spare approach as previously presented may be modified. For example, when a drive in a drive group fails, its pieces may be redistributed over the remaining drives in the drive group instead of to a single dedicated hot spare. This may serve to avoid bottlenecks associated with a dedicated hot spare where pieces from multiple volumes need to be reconstructed on the same hot spare. With this invention, the pieces may be reconstructed on separate drives when possible. Further, such redistribution ensures that two pieces from the same RAID volume do not end up on the same physical drive.

A drive group may be said to have a hot spare coverage of 1 when there may be enough free capacity in the drive group that any drive in the drive group may fail and there may be still enough free extents in the drive group to hold the pieces of the failed drive. In other words, should the drive with the highest used capacity fail, the system will still be able to reconstruct its pieces on the remaining drives in the drive group, (i.e. there are enough free extents on the drives in the drive group to hold all the pieces on that drive). Furthermore, a free extent large enough to hold the largest piece in the drive group (regardless of which drive that piece may be on) should be maintained.

A drive group may be said to have a hot spare coverage of n when n drives in the drive group fail and there is still sufficient capacity in the drive group that all the pieces in the failed drives may be reconstructed in free extents in the drive group. Note that this doesn't necessarily mean that n drives may fail simultaneously without data loss. For example, if a RAID 5 drive group includes a hot spare coverage of 2 but the 2 most loaded drives contain pieces from the same RAID volume and both of drives fail, that RAID volume may be no longer accessible no matter how much free capacity the drive group has.

The user may define the desired hot spare coverage for a drive group, i.e., 1, 2 . . . n. When a volume may be created, the storage array may distribute pieces such that the distribution may be as close to ideal as possible but with the restriction that configured hot spare coverage may be maintained. If the creation of the RAID volume will reduce the hot spare coverage, the user may be warned and requested to explicitly acknowledge the attendant consequences of proceeding with the RAID volume creation.

In addition, the performance degradation that reconstruction imposes on the RAID volumes will be reduced considerably as the load from performing the reconstruction may be distributed over many more drives than in the traditional approach so that reconstructions may be conducted in a parallel manner.

A drive reconstruction may be said to be parallel if the reconstruction of all its pieces may happen on separate drives in the drive group. A drive reconstruction may be said to be fully parallel, if it may be parallel and none of the drives on which pieces will be reconstructed overlap with the drives in reconstruction sets for the drive's pieces. This means if a drive fails, each piece may be reconstructed independently of all the other pieces on the drive both with respect to reads and writes.

Figure 5:
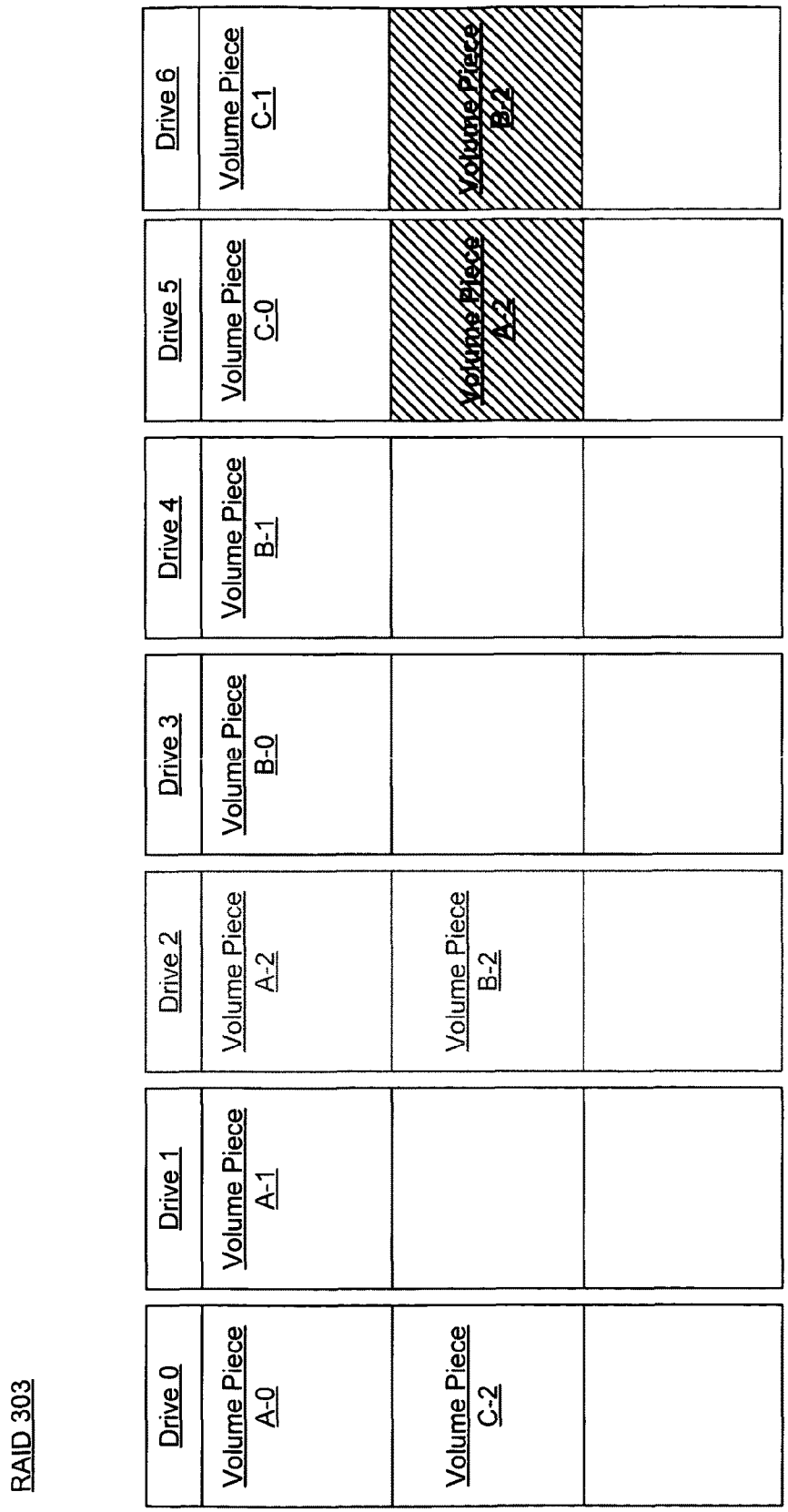
FIG. 5 shows a high-level system diagram for a RAID.

For example, referring to FIG. 5, an example of a fully parallel distribution is presented. In the case of a failure of Drive 2, piece A-2 may be reconstructed from pieces A-0 and A-2 (residing on Drive 0 and Drive 1 respectively) on Drive 5 which does not participate in any other ongoing piece reconstructions. Similarly, piece B-2 may be reconstructed from pieces B-0 and B-1 (residing on Drive 3 and Drive 4 respectively) on Drive 6. In such a configuration, a given drive is only subjected to either read operations or write operations.

Figure 6:
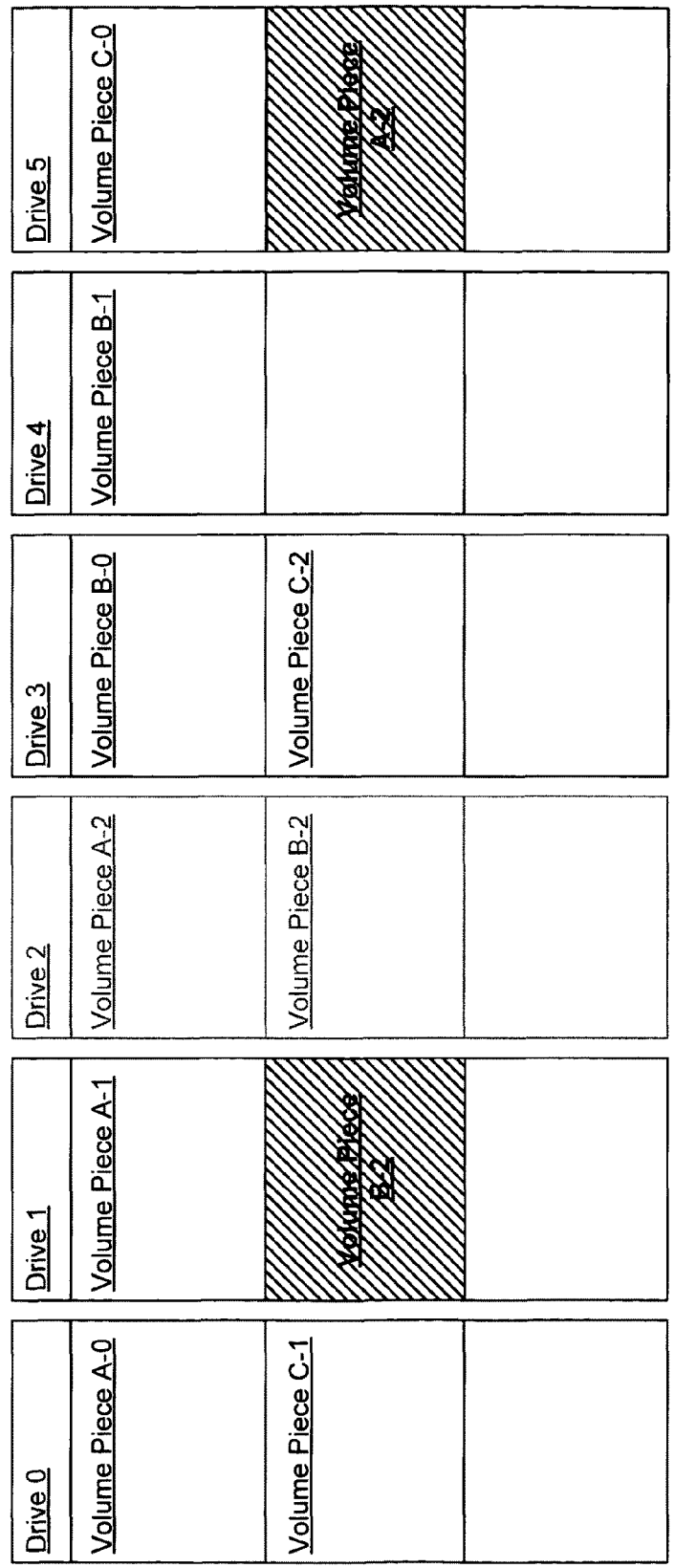
FIG. 6 shows a high-level system diagram for a RAID.

Referring to FIG. 6, an example of a partially parallel distribution is presented. In the case of a failure of Drive 2, piece A-2 may be reconstructed from pieces A-O and A-1 (residing on Drive 0 and Drive 1 respectively) on Drive 5 which does not participate in any other ongoing piece reconstructions. Similarly, piece B-2 may be reconstructed from pieces B-0 and B-1 (residing on Drive 3 and Drive 4 respectively) on Drive 1. However, Drive 1 is also being read to reconstruct piece A-2 so the reconstruction in this distribution is only partially parallel.

The greater the difference between RAID volume widths and drive group width, the more possibilities there may be for configurations allowing fully parallel drive reconstructions. Extra drives may be added to drive groups to increase capacity and width so reconstruction may happen as quickly as possible.

Whenever a drive is added to a drive group, the storage array may select pieces from the existing drives and move them to the new drive in order to get closer to an ideal distribution of pieces exhibiting fully parallel characteristics while maintaining a user defined hot spare coverage.

Note that it may be possible to define RAID volumes such that its layout degrades back to the original tightly coupled RAID layout. For example, if a RAID 5 drive group may include 3 unused 1 TB drives and the user defines a RAID volume of width 3 and capacity=3×1 TB−3× capacity reserved for configuration data. In this case, the storage array may allocate one volume piece to each 1 TB drive and any reconstruction would happen exactly like in the traditional layout. Consequently, in order to take full advantage of the inventive features, the user should define volumes with a width such that each piece may be small enough to share drives with other pieces from other volumes.

Figure 7:
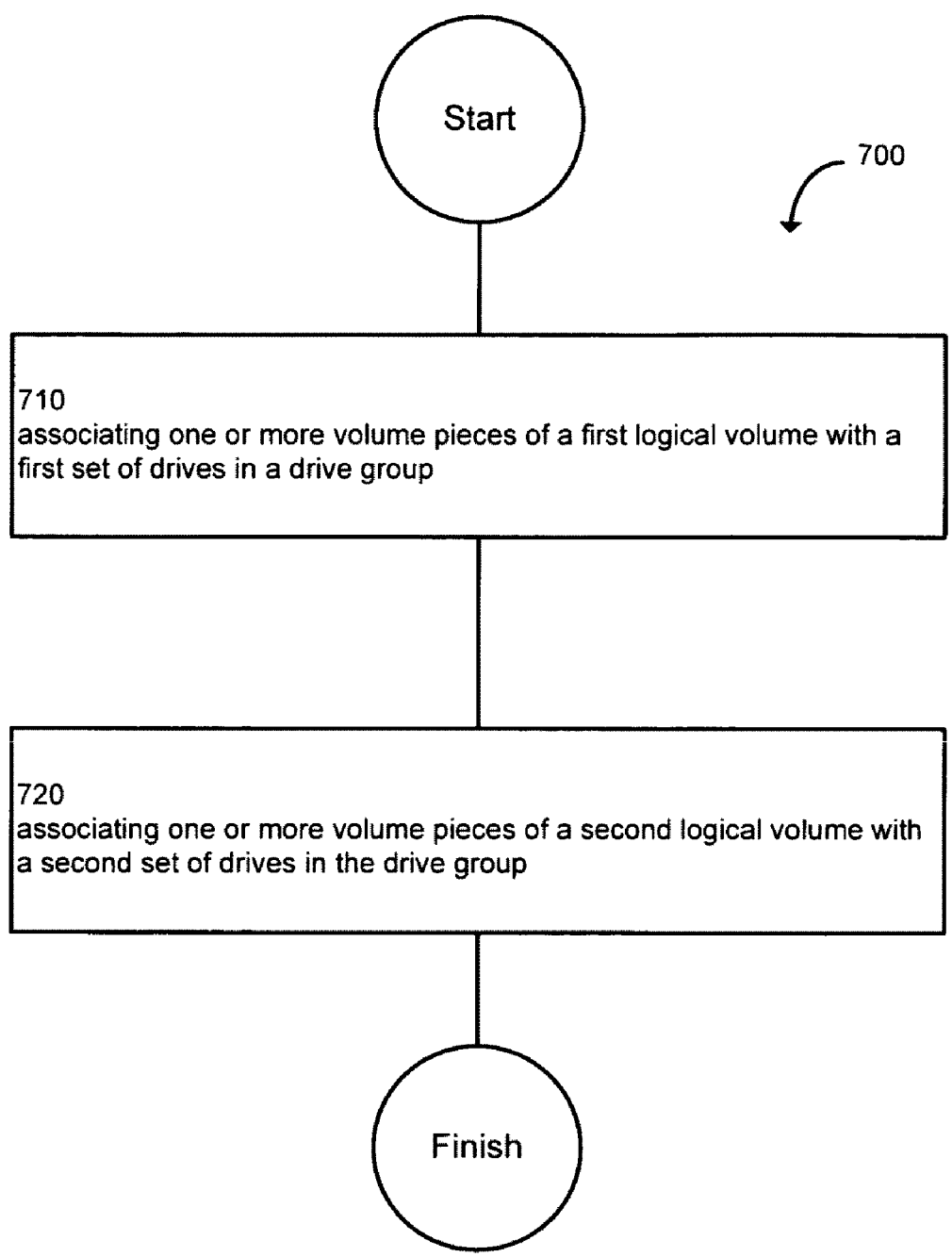
FIG. 7 shows a high-level operational flow diagram.

FIG. 7 illustrates an operational flow 700 representing example operations related to allocating volume pieces across a RAID. In FIG. 7 and in following figures that include various examples of operational flows, discussion and explanation may be provided with respect to the above-described examples of FIGS. 3-6, and/or with respect to other examples and contexts. However, it should be understood that the operational flows may be executed in a number of other environments and contexts, and/or in modified versions of FIGS. 3-6. Also, although the various operational flows are presented in the sequence(s) illustrated, it should be understood that the various operations may be performed in other orders than those which are illustrated, or may be performed concurrently.

After a start operation, the operational 710 illustrates associating one or more volume pieces of a first logical volume with a first set of drives in a drive group. For example, as shown in FIGS. 3-6, the RAID controller 302 may cause the RAID 303 to associate one or more volume pieces (e.g. Volume Pieces A-0, A-1 and A-2) with a first set of drives (e.g. Drive 0, Drive 1 and Drive 2, respectively).

Operation 720 illustrates associating one or more volume pieces of a second logical volume with a second set of drives in the drive group. For example, as shown in FIGS. 3-6, the RAID controller 302 may cause the RAID 303 to associate one or more volume pieces (e.g. Volume Pieces B-0, B-1 and B-2) with a second set of drives (e.g. Drive 3, Drive 4 and Drive 2, respectively).

The first set of drives (e.g. Drive 0, Drive 1 and Drive 2 associate with Volume A) may include at least one drive (e.g. Drive 0) which is not a member of the second set of drives in the drive group (e.g. Drive 3, Drive 4 and Drive 2 associated with Volume B)

Figure 8:
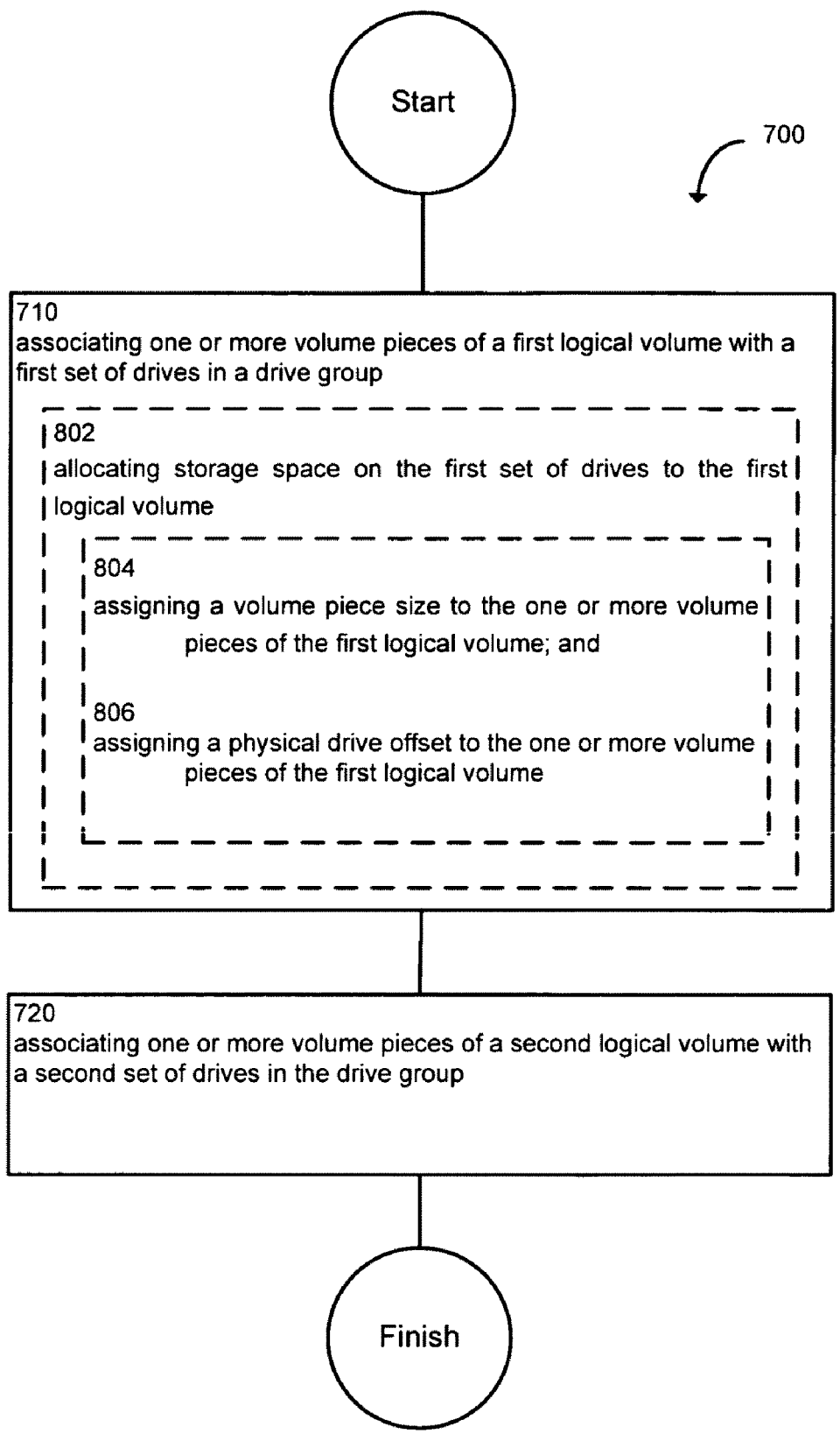
FIG. 8 shows a high-level operational flow diagram.

FIG. 8 illustrates alternative embodiments of the example operational flow 700 of FIG. 7. FIG. 8 illustrates example embodiments where the associating operation 710 may include at least one additional operation. Additional operations may include an operation 802, an operation 804 and/or an operation 806.

Operation 802 illustrates allocating storage space on the first set of drives to the first logical volume. For example, as shown in FIGS. 3-6, the RAID controller 302 may cause the RAID 303 to allocate storage space on a first set of drives (e.g. Drive 0, Drive 1 and Drive 2) to store data associated with a given logical volume (e.g. Volume A). The RAID controller 302 may assign various memory addresses as member addresses of a given volume.

Operation 804 illustrates assigning a volume piece size to the one or more volume pieces of the first logical volume. For example, as shown in FIGS. 3-6, the RAID controller 302 may cause the RAID 303 to assign a volume piece (e.g. Volume Piece B-2) a memory size (e.g. 1 Mb). The volume piece size for one or more volume pieces in a particular volume may have a common size (e.g. 1 Mb). The volume piece sizes for all volumes (e.g. Volume A, Volume B and Volume C) may all have a common size (e.g. 1 Mb).

Alternately, different volumes in the same drive group may have differently sized pieces (e.g. Volume A may have volume pieces 1 MB in size while Volume B may have volume pieces 2 Mb in size). The RAID controller 302 may maintain metadata for each volume tracking their respective pieces and the size and offset (in sectors/logical blocks) from the beginning of the drive for each piece.

Operation 806 illustrates assigning a physical drive offset to the one or more volume pieces of the first logical volume. For example, as shown in FIGS. 3-6, the RAID controller 302 may cause the RAID 303 to assign a volume piece a physical drive offset. The offset may define an offset of the first address of a volume piece from the physical beginning of a drive. The offset may comprise a number of volume piece sized-increments by which the first address of a volume piece is offset from the beginning of a physical drive. For example, as shown in FIG. 3, Volume Piece B-2 may have a 1 Mb offset with respect to the beginning of Drive 2.

The physical drive offset of a first volume piece (e.g. Volume Piece B-0 may have a physical drive offset of 0) of a given logical volume may be different from a physical drive offset of a second volume piece (e.g. Volume Piece B-2 may have a physical drive offset of 1) of the logical volume.

Figure 9:
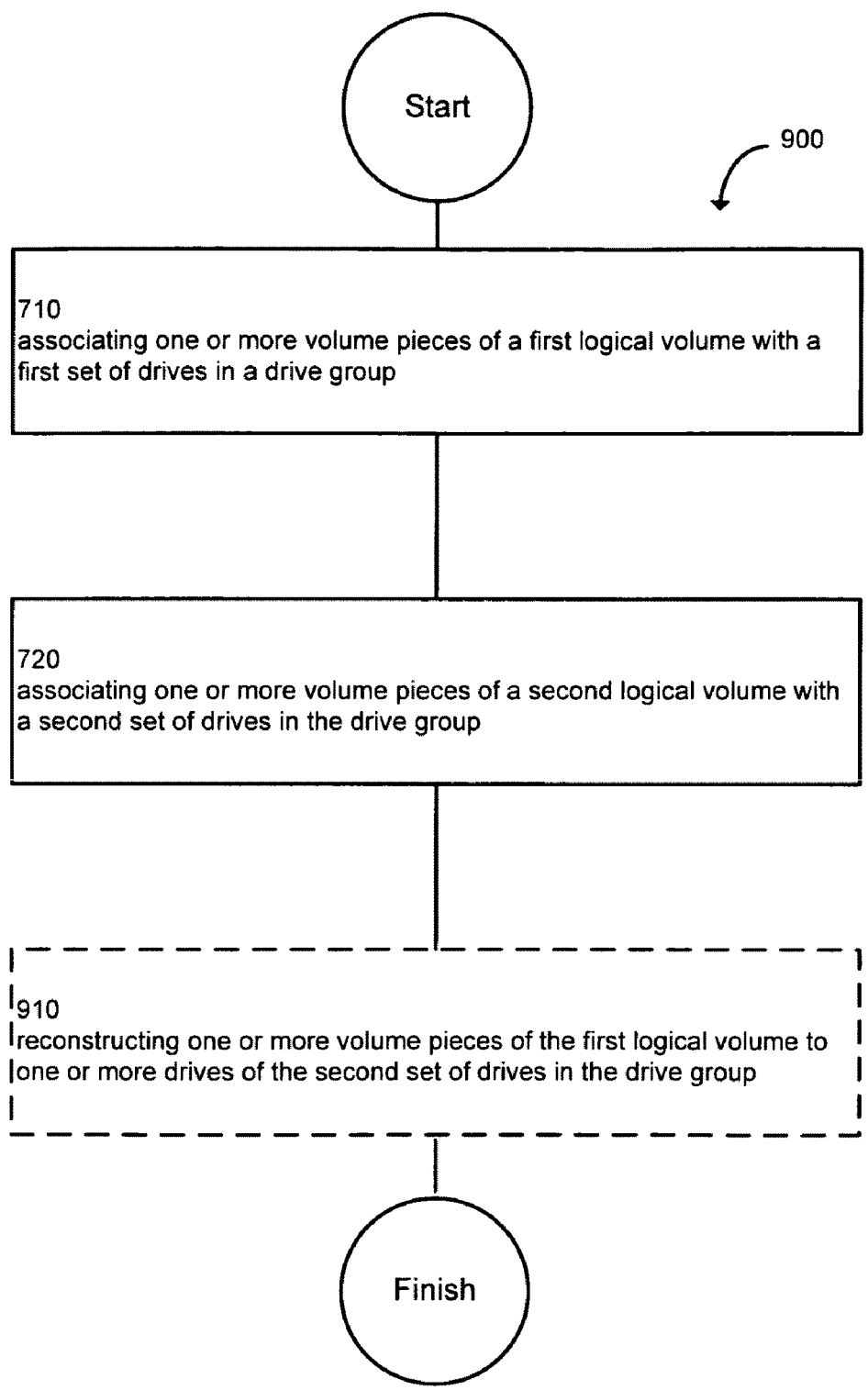
FIG. 9 shows a high-level operational flow diagram.

FIG. 9 illustrates alternative embodiments of the example operational flow 700 of FIG. 7. FIG. 9 illustrates example embodiments where the operational flow 700 may include at least one additional operation. Additional operations may include an operation 910.

Operation 910 illustrates reconstructing one or more volume pieces of the first logical volume to one or more drives of the second set of drives in the drive group. For example, as shown in FIGS. 3-6, upon failure a drive (e.g. Drive 2) which includes a volume piece of one or more volumes (e.g. Volume B), the RAID controller 302 may cause the RAID 303 to reconstruct one or more volume pieces (e.g. Volume Piece B-2) to a drive which does not include another piece of the subject Volume (e.g. Drive 1 which contains only a Volume A piece).

Figure 10:
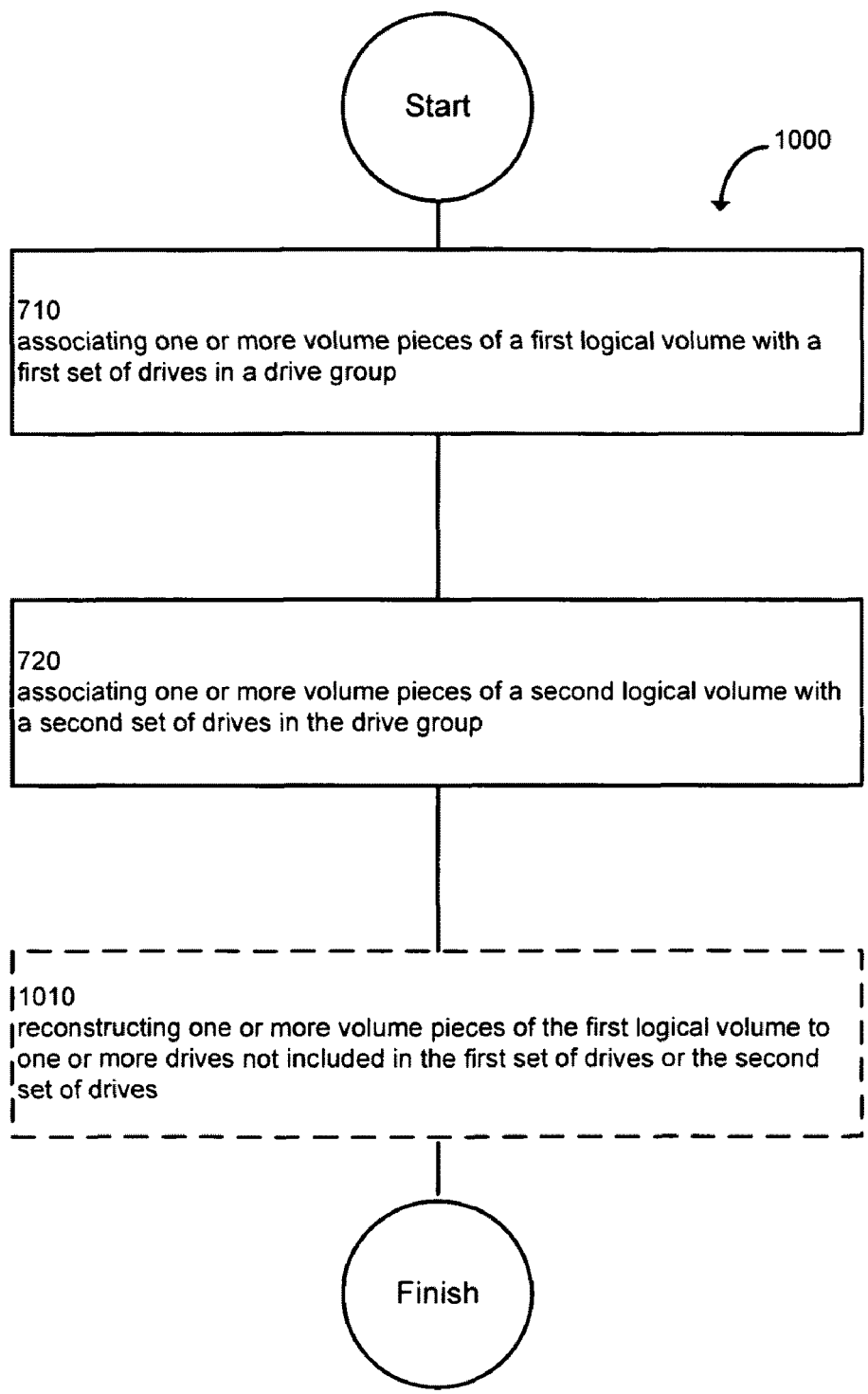
FIG. 10 shows a high-level operational flow diagram.

FIG. 10 illustrates alternative embodiments of the example operational flow 700 of FIG. 7. FIG. 10 illustrates example embodiments where the operational flow 700 may include at least one additional operation. Additional operations may include an operation 1010.

Operation 1010 illustrates reconstructing one or more volume pieces of the first logical volume to one or more drives not included in the first set of drives or the second set of drives. For example, as shown in FIGS. 3-6, upon failure a drive (e.g. Drive 2) which includes a volume piece of one or more volumes (e.g. Volume A and Volume B), the RAID controller 302 may cause the RAID 303 to reconstruct one or more volume pieces (e.g. Volume Piece A-2 and Volume Piece B-2) of the failed drive to a drive which does not include another piece of the Volumes of the failed drive (e.g. one or more Volume Piece A-2 and Volume Piece B-2 may be reconstructed to Drive 5 which contains only a Volume C piece).

Figure 11:
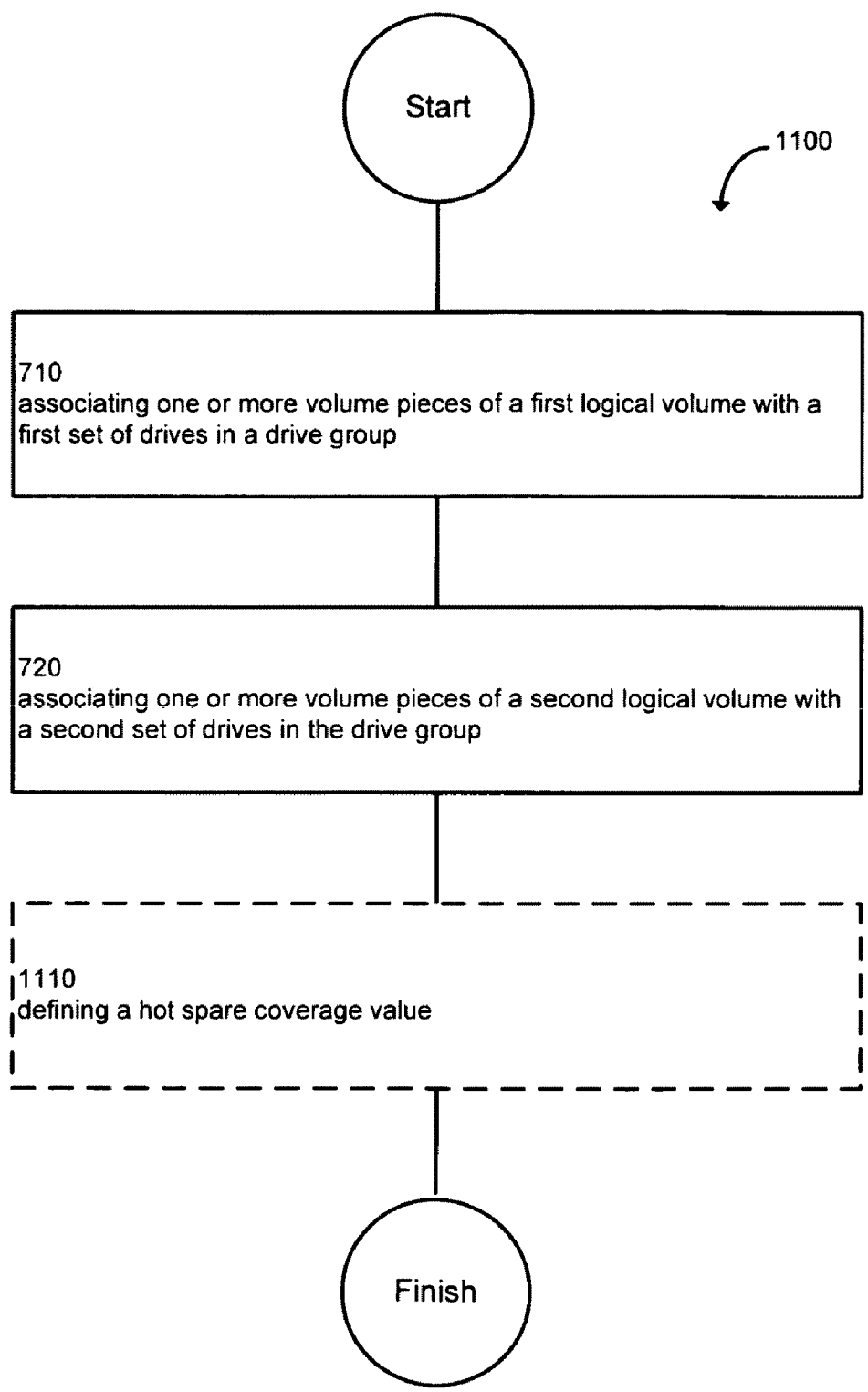
FIG. 11 shows a high-level operational flow diagram.

FIG. 11 illustrates alternative embodiments of the example operational flow 700 of FIG. 7. FIG. 11 illustrates example embodiments where the operational flow 700 may include at least one additional operation. Additional operations may include an operation 1110.

Operation 1110 illustrates defining a hot spare coverage value. For example, as shown in FIGS. 3-6, the RAID controller 302 may receive an input from the computing device 301 (e.g. a user input) or may include internal circuitry for automatically defining a hot spare coverage value. A drive group may be said to have a hot spare coverage of n when n drives in the drive group fail and there is still sufficient capacity in the drive group that all the pieces in the failed drives may be reconstructed in free extents in the drive group. For example, as shown in FIGS. 3-6, the RAID 303 may have a hot spare coverage value of 1 when the sufficient drive space exists for the drive with the highest used capacity (e.g. Drive 0, Drive 2 and Drive 3) to be reconstructed to the remaining drives (e.g. Drive 1, Drive 4 or Drive 5 must have sufficient storage space to accommodate reconstruction of Drive 0, Drive 2 or Drive 3). Furthermore, a free extent large enough to hold the largest piece in the drive group may be maintained (e.g. if Volume Piece A-0 is larger than Volume Piece C-1, a free extent at least as large as Volume Piece A may be required ). A drive group may be said to have a hot spare coverage of n when n drives in the drive group fail and there is still sufficient capacity in the drive group that all the pieces in the failed drives may be reconstructed in free extents in the drive group.

Figure 12:
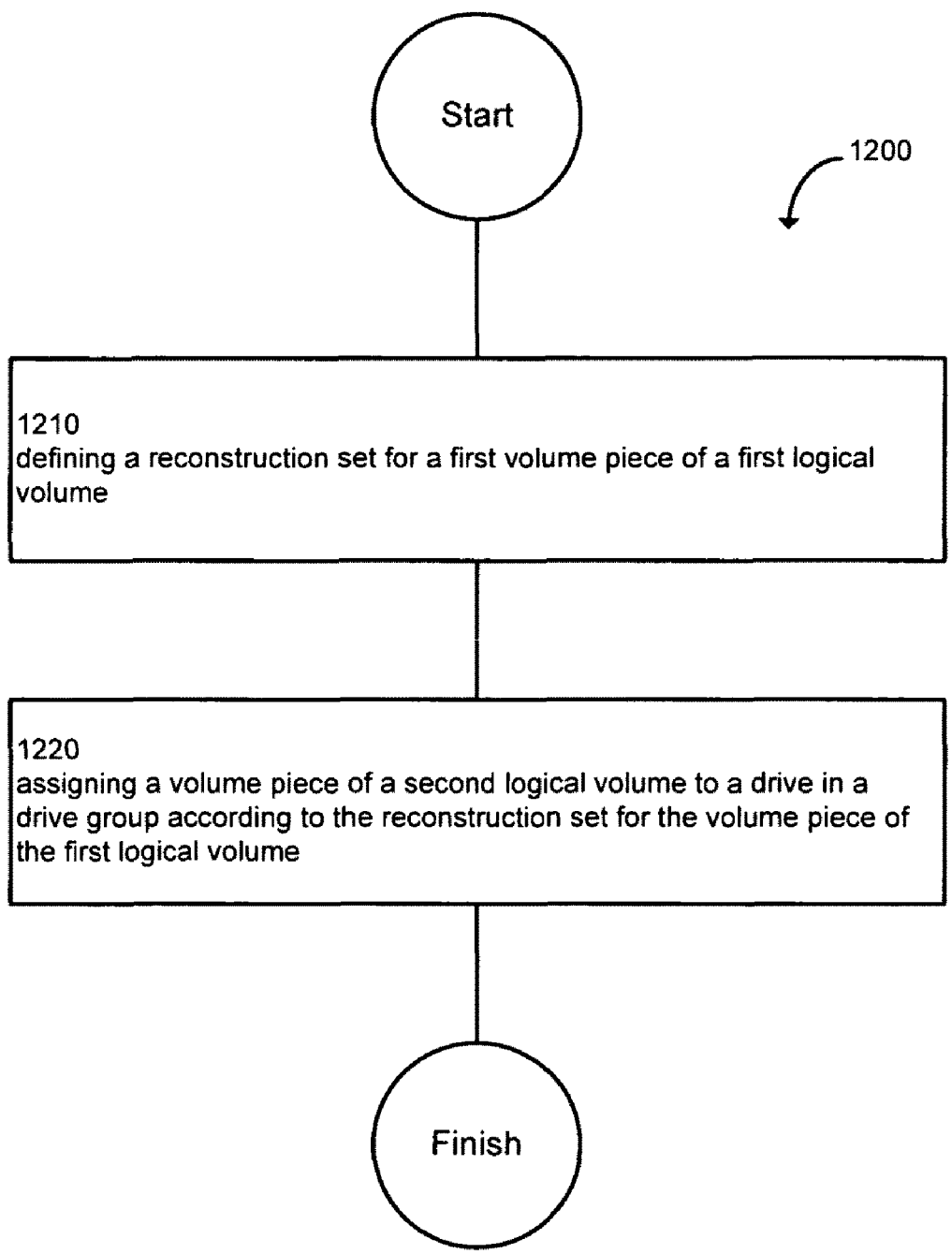
FIG. 12 shows a high-level operational flow diagram.

FIG. 12 illustrates an operational flow 1200 representing example operations related to allocating volume pieces across a RAID. In FIG. 12 and in following figures that include various examples of operational flows, discussion and explanation may be provided with respect to the above-described examples of FIGS. 3-6, and/or with respect to other examples and contexts. However, it should be understood that the operational flows may be executed in a number of other environments and contexts, and/or in modified versions of FIGS. 3-6. Also, although the various operational flows are presented in the sequence(s) illustrated, it should be understood that the various operations may be performed in other orders than those which are illustrated, or may be performed concurrently.

After a start operation, the operation 1210 illustrates defining a reconstruction set for a first volume piece of a first logical volume. For example, as shown in FIGS. 3-6, the RAID controller 302 may cause the RAID 303 to define a reconstruction set for a first volume piece of a first logical volume. A reconstruction set may include the set of drives that contain the remaining pieces in that RAID volume. For example, the reconstruction set of Volume Piece A-2 may be Drive 0 and Drive 1.

Operation 1220 illustrates assigning a volume piece of a second logical volume to a drive in a drive group according to the reconstruction set for the volume piece of the first logical volume. For example, as shown in FIGS. 3-6, the RAID controller 302 may cause the RAID 303 to assign one or more volume pieces (e.g. Volume Piece A-0, Volume Piece A-1 and Volume Piece A-2) of a first logical volume to one or more drives (e.g. Drive 0, Drive 1 and Drive 2, respectively). The RAID controller 302 may cause the RAID 303 to assign one or more volume pieces (Volume Piece B-0, Volume Piece B-1 and/or Volume Piece B-2) of a second logical volume to one or more drives such that the overlap of volume pieces of the first logical volume and the second logical volume is minimized.

Figure 13:
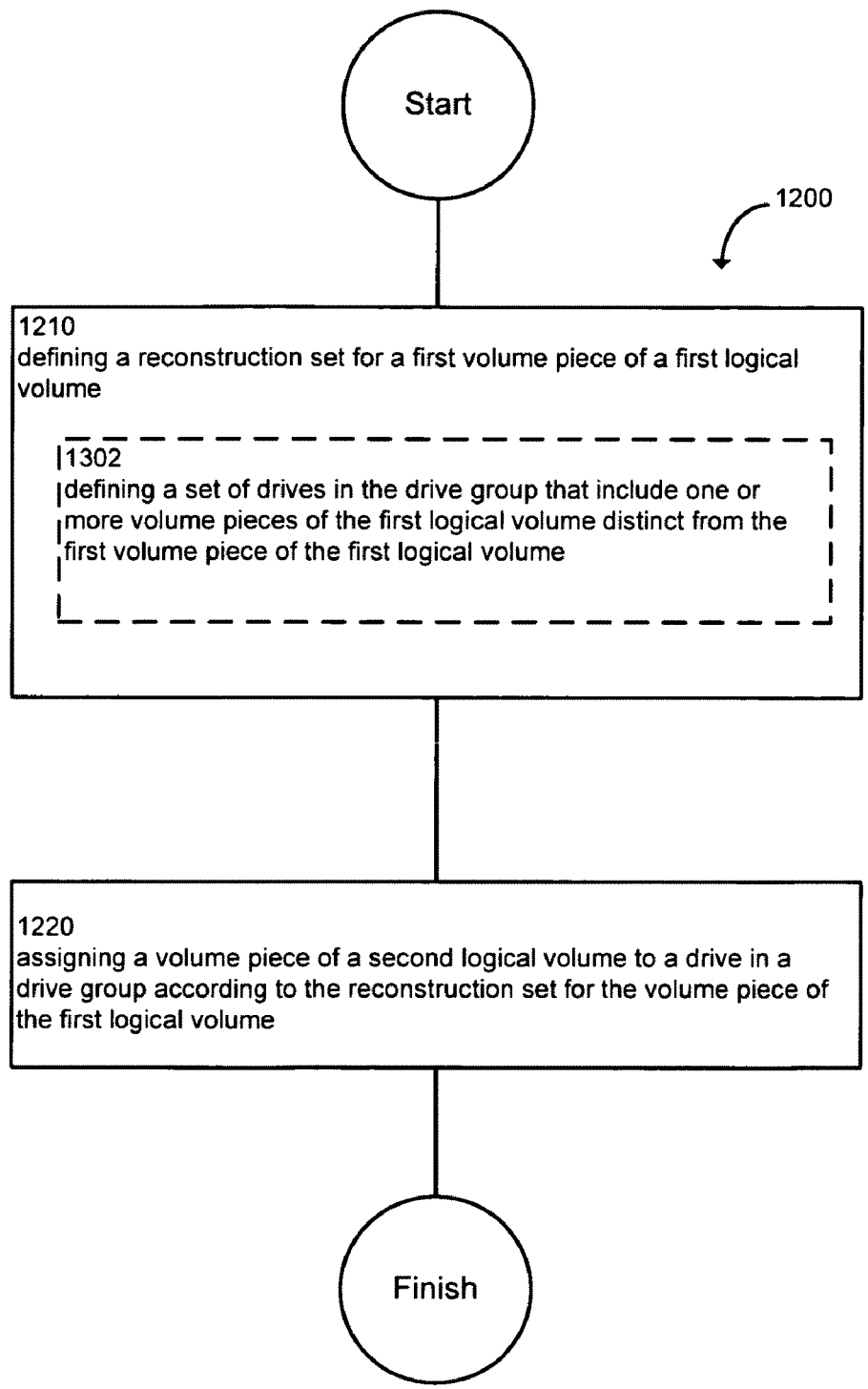
FIG. 13 shows a high-level operational flow diagram.

FIG. 13 illustrates alternative embodiments of the example operational flow 1200 of FIG. 12. FIG. 13 illustrates example embodiments where the defining operation 1210 may include at least one additional operation. Additional operations may include an operation 1302.

Operation 1302 illustrates defining a set of drives in the drive group that include one or more volume pieces of the first logical volume distinct from the first volume piece of the first logical volume. For example, as shown in FIGS. 3-6, the RAID controller 302 may cause the RAID 303 to define a reconstruction set for a first volume piece of a first logical volume. A reconstruction set may include the set of drives that contain the remaining pieces in that RAID volume. For example, the reconstruction set of Volume Piece A-2 may be Drive 0 and Drive 1.

Furthermore, the reconstruction sets for the volume pieces of two or more volumes in a drive group may be disjoint (e.g. all drives in the drive group includes at most one volume piece from a particular volume).

Figure 14:
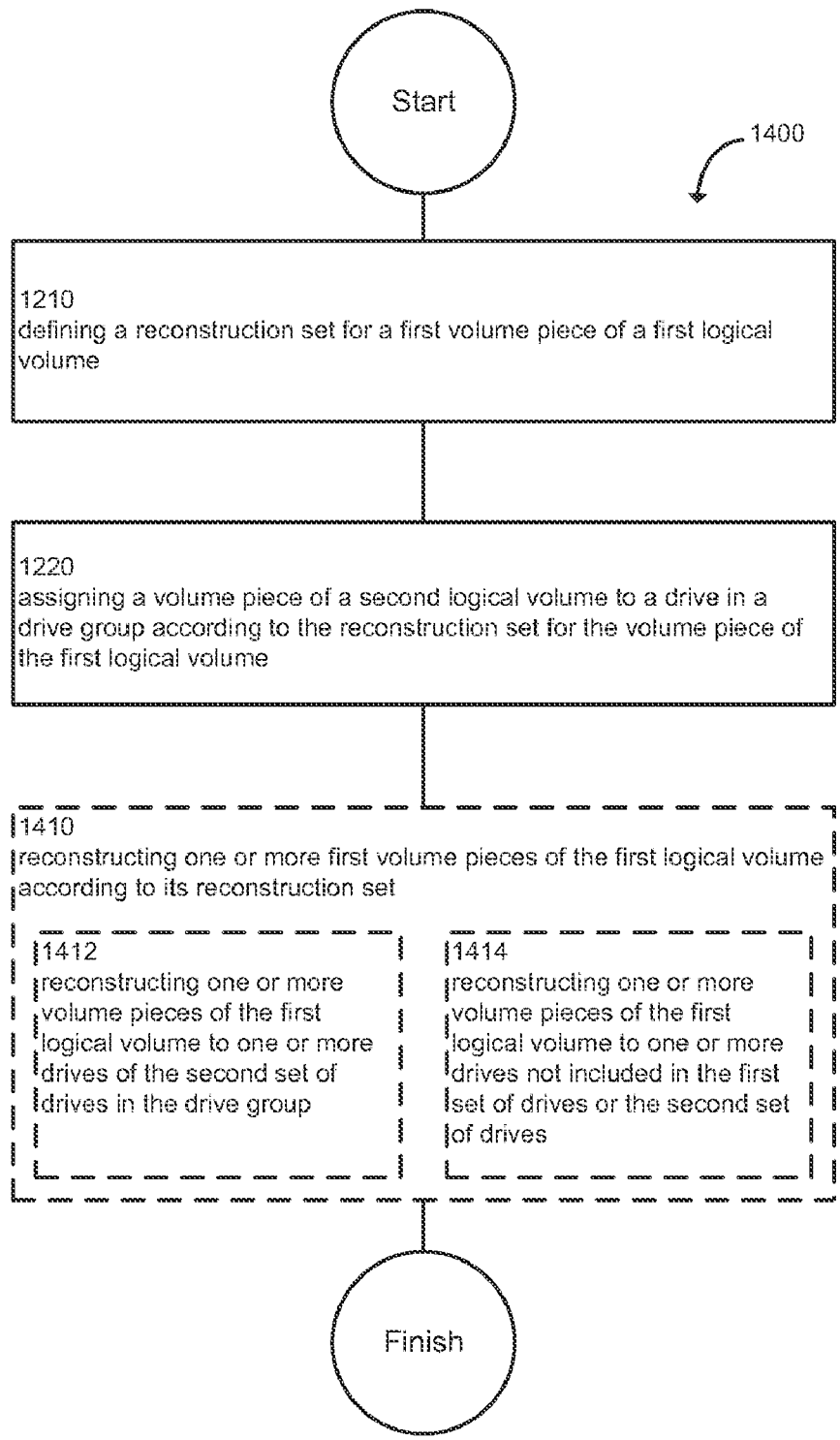
FIG. 14 shows a high-level operational flow diagram.

FIG. 14 illustrates alternative embodiments of the example operational flow 1200 of FIG. 12. FIG. 12 illustrates example embodiments where the operational flow 100 may include at least one additional operation. Additional operations may include an operation 1410, an operation 1412 and/or an operation 1414.

Operation 1410 illustrates reconstructing a volume piece of the first logical volume to according to the reconstruction set of the volume piece of the first logical volume. For example, as shown in FIGS. 3-6, upon failure a drive (e.g. Drive 2) which includes a volume piece of one or more volumes (e.g. Volume B), the RAID controller 302 may cause the RAID 303 to reconstruct one or more volume pieces (e.g. Volume Piece B-2) to a drive which does not include another piece of the subject volume (e.g. to a drive not included in its reconstruction set).

Operation 1412 illustrates reconstructing one or more volume pieces of the first logical volume to one or more drives of the second set of drives in the drive group. For example, as shown in FIGS. 3-6, upon failure a drive (e.g. Drive 2) which includes a volume piece of one or more volumes (e.g. Volume B), the RAID controller 302 may cause the RAID 303 to reconstruct one or more volume pieces (e.g. Volume Piece B-2) to a drive which does not include another piece of the subject Volume (e.g. Drive 1 which contains only a Volume A piece).

Operation 1414 illustrates reconstructing one or more volume pieces of the first logical volume to one or more drives not included in the first set of drives or the second set of drives. For example, as shown in FIGS. 3-6, upon failure a drive (e.g. Drive 2) which includes a volume piece of one or more volumes (e.g. Volume A and Volume B), the RAID controller 302 may cause the RAID 303 to reconstruct one or more volume pieces (e.g. Volume Piece A-2 and Volume Piece B-2) of the failed drive to a drive which does not include another piece of the Volumes of the failed drive (e.g. one or more Volume Piece A-2 and Volume Piece B-2 may be reconstructed to Drive 5 which contains only a Volume C piece).

Figure 15:
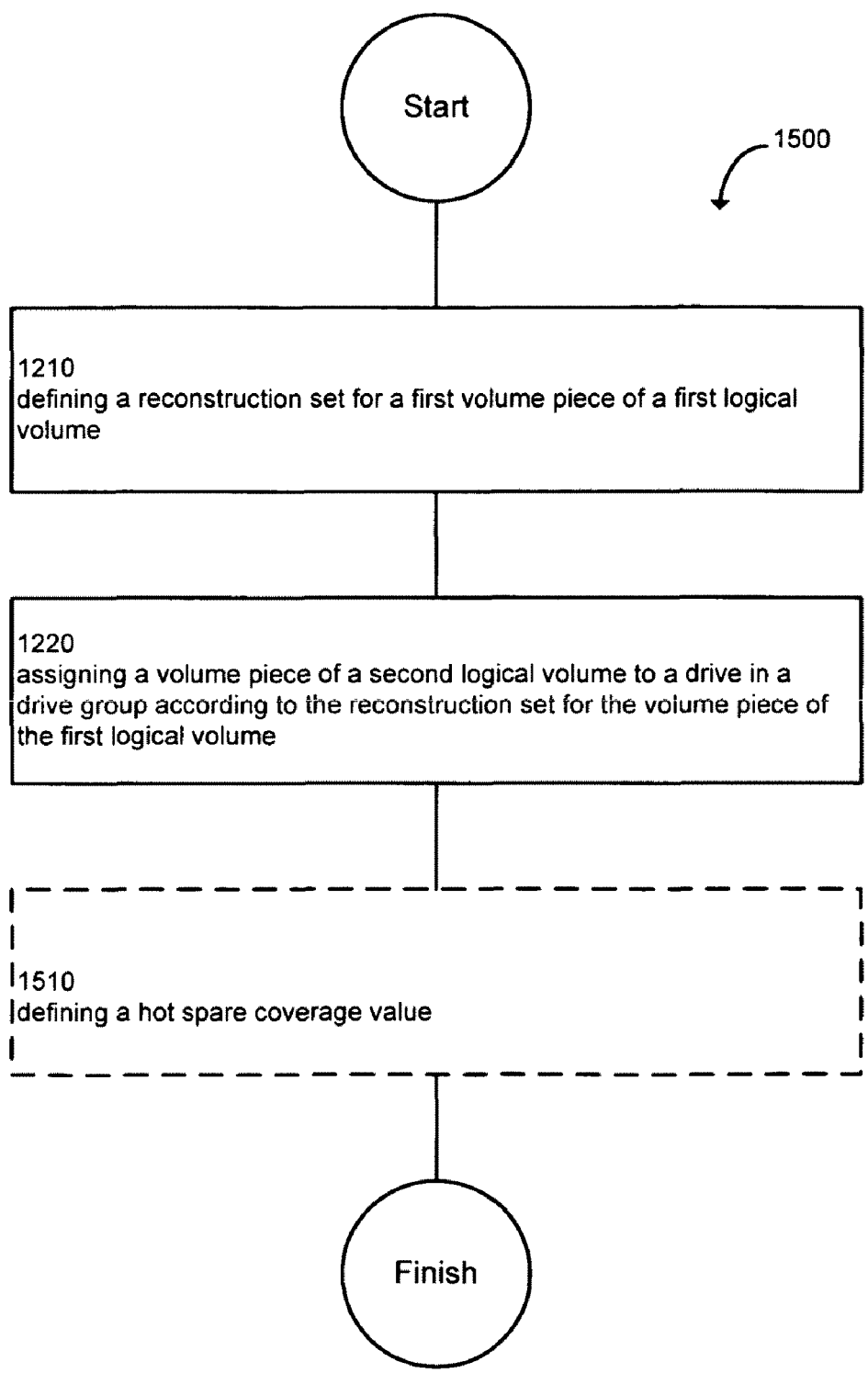

FIG. 15 illustrates alternative embodiments of the example operational flow 1200 of FIG. 12. FIG. 12 illustrates example embodiments where the operational flow 100 may include at least one additional operation. Additional operations may include an operation 1510.

Operation 1510 illustrates defining a hot spare coverage value. For example as shown In FIGS. 3-6, the RAID controller 302 may receive an Input from the computing device 301 (e.g. a user input) or may include internal circuitry for automatically defining a hot spare coverage value. A drive group may be said to have a hot spare coverage of n when n drives in the drive group fail and there is still sufficient capacity in the drive group that all the pieces in the failed drives may be reconstructed in free extents in the drive group. For example, as shown in FIGS. 3-6, the RAID 303 may have a hot spare coverage value of 1 when the sufficient drive space exists for the drive with the highest used capacity (e.g. Drive 0, Drive 2 and Drive 3) to be reconstructed to the remaining drives (e.g. Drive 1, Drive 4 or Drive 5 must have sufficient storage space to accommodate reconstruction of Drive 0, Drive 2 or Drive 3). Furthermore, a free extent large enough to hold the largest piece in the drive group may be maintained (e.g. if Volume Piece A-0 is larger than Volume Piece C-1, a free extent at least as large as Volume Piece A may be required ). A drive group may be said to have a hot spare coverage of n when n drives in the drive group fail and there is still sufficient capacity in the drive group that all the pieces in the failed drives may be reconstructed in free extents in the drive group.

It is believed that the present invention and many of its attendant advantages will be understood by the foregoing description. It may be also believed that it will be apparent that various changes may be made in the form, construction and arrangement of the components thereof without departing from the scope and spirit of the invention or without sacrificing all of its material advantages. The form herein before described being merely an explanatory embodiment thereof. It may be the intention of the following claims to encompass and include such changes.

The foregoing detailed description may include set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

In addition, those skilled in the art will appreciate that the mechanisms of the subject matter described herein may be capable of being distributed as a program product in a variety of forms, and that an illustrative embodiment of the subject matter described herein applies regardless of the particular type of signal bearing medium used to actually carry out the distribution. Examples of a signal bearing medium include, but may be not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link (e.g., transmitter, receiver, transmission logic, reception logic, etc.), etc.).

Those having skill in the art will recognize that the state of the art may include progressed to the point where there may be little distinction left between hardware, software, and/or firmware implementations of aspects of systems; the use of hardware, software, and/or firmware may be generally (but not always, in that in certain contexts the choice between hardware and software may become significant) a design choice representing cost vs. efficiency tradeoffs. Those having skill in the art will appreciate that there may be various vehicles by which processes and/or systems and/or other technologies described herein may be effected (e.g., hardware, software, and/or firmware), and that the preferred vehicle will vary with the context in which the processes and/or systems and/or other technologies may be deployed. For example, if an implementer determines that speed and accuracy may be paramount, the implementer may opt for a mainly hardware and/or firmware vehicle; alternatively, if flexibility may be paramount, the implementer may opt for a mainly software implementation; or, yet again alternatively, the implementer may opt for some combination of hardware, software, and/or firmware. Hence, there may be several possible vehicles by which the processes and/or devices and/or other technologies described herein may be effected, none of which may be inherently superior to the other in that any vehicle to be utilized may be a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

What is claimed is:

1. A method for allocating volume pieces across a redundant array of inexpensive discs (RAID), the method comprising:
    associating one or more volume pieces of a first logical volume with a first set of drives in a drive group;
    associating one or more volume pieces of one or more second logical volumes with one or more second sets of drives in the drive group,
    wherein the first set of drives is different than a set of drives associated with any second logical volume.

2. The method of claim 1, wherein associating one or more volume pieces of a first logical volume with a first set of drives in a drive group further comprises:
    allocating storage space on the first set of drives to the first logical volume.

3. The method of claim 2, wherein allocating storage space on the first set of drives to the first logical volume further comprises:
    assigning a volume piece size to the one or more volume pieces of the first logical volume; and
    assigning a physical drive offset to the one or more volume pieces of the first logical volume.

4. The method of claim 3, wherein a physical drive offset of a first volume piece of the one or more volume pieces of the first logical volume is different from a physical drive offset of a second volume piece of the one or more volume pieces of the first logical volume.

5. The method of claim 1, further comprising:
    defining a hot spare coverage value.

6. A system for allocating volume pieces across a redundant array of inexpensive discs (RAID) comprising:
    means for associating one or more volume pieces of a first logical volume with a first set of drives in a drive group;
    means for associating one or more volume pieces of one or more second logical volumes with one or more second sets of drives in the drive group;
    wherein the first set of drives is different than a set of drives associated with any second logical volume.

7. A method for allocating volume pieces across a redundant array of inexpensive discs (RAID), the method comprising:
    determining a reconstruction set for a first volume piece of a first logical volume;
    allocating one or more volume pieces of a second logical volume to one or more drives in a drive group such that a reconstruction set for each of the one or more volume pieces of the second logical volume logical volume is disjoint with the reconstruction set for the first volume piece of the first logical volume.

8. The method of claim 7, further comprising:
    reconstructing a volume piece of the first logical volume according to the reconstruction set of the volume piece of the first logical volume.

9. The method of claim 7, further comprising:
    defining a hot spare coverage value.

10. A redundant array of inexpensive discs (RAID) comprising:
    one or more volume pieces of a first logical volume distributed across a first set of drives in a drive group;
    one or more volume pieces of one or more second logical volumes distributed across one or more second sets of drives in the drive group;
    wherein the first set of drives is different than a set of drives associated with any second logical volume.

* * * * *